(12) United States Patent
Dey

(10) Patent No.: US 12,413,978 B2
(45) Date of Patent: *Sep. 9, 2025

(54) SURROGATE CACHE FOR OPTIMIZED SERVICE ACCESS WITH COMPACT USER OBJECTS AND OFFLINE DATABASE UPDATES

(71) Applicant: Oracle International Corporation, Redwood Shores, CA (US)

(72) Inventor: Debdulal Dey, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,794

(22) Filed: Nov. 20, 2023

(65) Prior Publication Data

US 2024/0089341 A1 Mar. 14, 2024

Related U.S. Application Data

(63) Continuation of application No. 17/556,889, filed on Dec. 20, 2021, now Pat. No. 11,824,955, which is a
(Continued)

(51) Int. Cl.
*H04W 12/08* (2021.01)
*G06F 16/23* (2019.01)
(Continued)

(52) U.S. Cl.
CPC ........ *H04W 12/08* (2013.01); *G06F 16/2372* (2019.01); *H04L 63/102* (2013.01);
(Continued)

(58) Field of Classification Search
CPC ................ H04W 12/08; G06F 16/2372; G06F 16/24552; G06F 21/6218; H04L 63/102;
(Continued)

(56) References Cited

U.S. PATENT DOCUMENTS

| 4,897,781 A | * | 1/1990 | Chang | ................ G06F 12/0813 707/827 |
| 6,539,382 B1 | * | 3/2003 | Byrne | ................ G06F 16/24552 707/812 |

(Continued)

FOREIGN PATENT DOCUMENTS

| JP | 2012501010 A | 1/2012 |
| JP | 2015176548 A | 10/2015 |

(Continued)

OTHER PUBLICATIONS

Japanese Application No. 2023-515635, Office Action mailed on May 7, 2025, 5 pages.

*Primary Examiner* — El Hadji M Sall
(74) *Attorney, Agent, or Firm* — Kilpatrick Townsend & Stockton LLP

(57) ABSTRACT

When a request for accessing a service is received, a user object may be stored in a long-term data store, as well as in a short-term cache. The cache may be divided into a regular cache that stores full versions of the user objects, and a surrogate cache that stores compact versions of the user object. The compact version of the user object may include a field that is derived from the full user object indicating whether a subsequent request for access to a particular service should be granted. After access is granted/denied based on this value in the compact user object, the system can process an update to the full user object offline. This
(Continued)

surrogate cache structure may be used to rapidly approve/deny requests, decoupling this procedure from the processing involved with a full user object.

20 Claims, 11 Drawing Sheets

Related U.S. Application Data continuation of application No. 17/015,697, filed on Sep. 9, 2020, now Pat. No. 11,206,313.

(51) Int. Cl.
*H04L 9/40* (2022.01)
*H04L 67/01* (2022.01)
*H04L 67/1097* (2022.01)
*H04L 67/5682* (2022.01)

(52) U.S. Cl.
CPC ............ *H04L 63/105* (2013.01); *H04L 63/20* (2013.01); *H04L 67/01* (2022.05); *H04L 67/1097* (2013.01); *H04L 67/5682* (2022.05)

(58) Field of Classification Search
CPC ....... H04L 63/105; H04L 63/20; H04L 67/01; H04L 67/1097; H04L 67/5682; H04L 63/10

See application file for complete search history.

(56) References Cited

U.S. PATENT DOCUMENTS

| 7,185,047 | B1 * | 2/2007 | Bate | H04L 63/08 |
| | | | | 726/17 |
| 8,874,696 | B1 * | 10/2014 | Daruwalla | H04L 67/568 |
| | | | | 709/219 |
| 9,088,892 | B1 * | 7/2015 | Cham | H04L 63/0876 |
| 2021/0096825 | A1 * | 4/2021 | Gray | G06F 8/30 |

FOREIGN PATENT DOCUMENTS

| JP | 2017515212 A | 6/2017 |
| JP | 2019521544 A | 7/2019 |

* cited by examiner

SURROGATE CACHE FOR OPTIMIZED SERVICE ACCESS WITH COMPACT USER OBJECTS AND OFFLINE DATABASE UPDATES

CROSS-REFERENCE TO RELATED APPLICATIONS

This application is a continuation of U.S. patent application Ser. No. 17/556,889, filed Dec. 20, 2021, which is incorporated herein by reference. U.S. patent application Ser. No. 17/556,889 is a continuation of U.S. patent application Ser. No. 17/015,697, filed Sep. 9, 2020, which is incorporated herein by reference.

BACKGROUND

Real-time request processing is a key component in many modern telecom and online services. When a request from the client device is received, a service may act as an access control point for accessing any type of online service. A central service may also act as a court a management server that tracks all of the allowances or balances in real time. When a network request is received, the central service attempts to process the request in real time as much as possible to avoid undesired connection latency at the client device. However, determining whether access should be granted to a service can be a processing-intensive and latency-intensive undertaking. Numerous calculations may be performed and data may need to be retrieved from data storage systems for the particular user. This information may then need to be processed in order to answer the question as to whether access should be granted in this particular instance. Processing requests for accessing real-time may strain the ability of some systems to handle millions of different user accounts. As the number of users grow, feasible cache systems may be outgrown. Therefore, improvements are needed in services that evaluate requests for online access in real time.

BRIEF SUMMARY

Real-time requests may be received by an access service for approval in order to establish a connection to a service provider. As requests are received in real time, users expect real-time results. Therefore, the process for approving a request for access or a connection to a service should be processed as fast as possible. When a request is received, a user object may be stored in a long-term data store, as well as in a short-term cache. In order to decouple the process for approving a request from the process of processing, updating, and handling full user objects, the cache may be subdivided into two different levels. The first cache may include full user objects. A full user object may include a subdivision for each service to which the user has subscribed or to which the user has access. Each service subdivision may include a plurality of fields that describe types of access that are allowed; balances of minutes, content, data, etc.; usage restrictions; and/or other settings that may determine whether a specific request for that service should be granted or denied.

In addition to the first cache, the system may include a second cache, referred to as a "surrogate" cache. The surrogate cache may include compact user objects rather than full user objects. The compact user objects may include a field for each service, and this field may include an indication as to whether requests for the corresponding service should be granted. Instead of retrieving a full user object and processing a plurality of different fields within that full user object to approve a request, the system can instead access the compact user object in the surrogate cache and approve/deny the request based on the value of the field for the corresponding service. The field in the compact user object may be derived from fields in the full user object using update logic that is performed off-line prior to the request being received. Thus, requests do not have to wait for this processing to be done in response to receiving the request, since it has already been performed off-line. Requests/denials may be granted without the extensive retrieval and processing delays of the full user object. Furthermore, the size of the compact user object allows the compact user object to be stored in the surrogate cache for every user, so no cache misses are likely to occur, which would normally result in a central data store of full user objects being accessed.

The field for each service in the compact user objects may include binary yes/no values for approving requests. Other implementations may use a range of values, such GREEN, YELLOW, RED, etc. Intermediate values (e.g. YELLOW) may grant access to the service in a limited capacity. For example, the field in the compact user object may be set to YELLOW when a quota of minutes, data, storage, etc., is close to being exceeded. Access may then be granted for requests that are not likely to exceed the remaining quota or with other content restrictions in place.

After a request is granted a record of usage may be stored off-line and processed asynchronously. For example, records of granted requests for access may be stored together in a queue that is processed as a batch by the system. Change events may be generated that update remaining resource balances in full user objects in both the first cache and a central storage. The update logic may then be performed again to generate a new value for the field in the compact user object in the surrogate cache.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

This disclosure describes embodiments for evaluating requests for access to network services in real time. When a request is received, a user object may be stored in a long-term data store, as well as a short-term cache. The cache may include a first cache that stores full versions of the user object, as well as a second cache, or surrogate cache, that stores compact versions of the user object. The compact version of the user object may include a field that indicates whether a subsequent request for access to a particular service should be granted. This field may be derived from a plurality of other fields in the full user object in the first cache. For example, prior to requesting access to a service, the full user object may include a service level, types of access that are allowed, a time balance remaining for the user account, and/or other information related to a specific subscription to the service. To populate the field in the compact user object in the first cache, the system may process all of this information and determine that the next request should be granted. For example, if the user object lists a particular service level with a sufficient remaining balance, the field in the first cache may be set to a value such as "GREEN" indicating that subsequent requests should be granted immediately without requiring further processing. After access is granted/denied based on this value in the compact user object, the system can process an update to a balance or value in the full user object offline. For example, a remaining balance may be updated in the full user object after access been granted. This effectively decouples the processing of real-time requests with the updating and evaluation of information in the user object.

Figure 1:
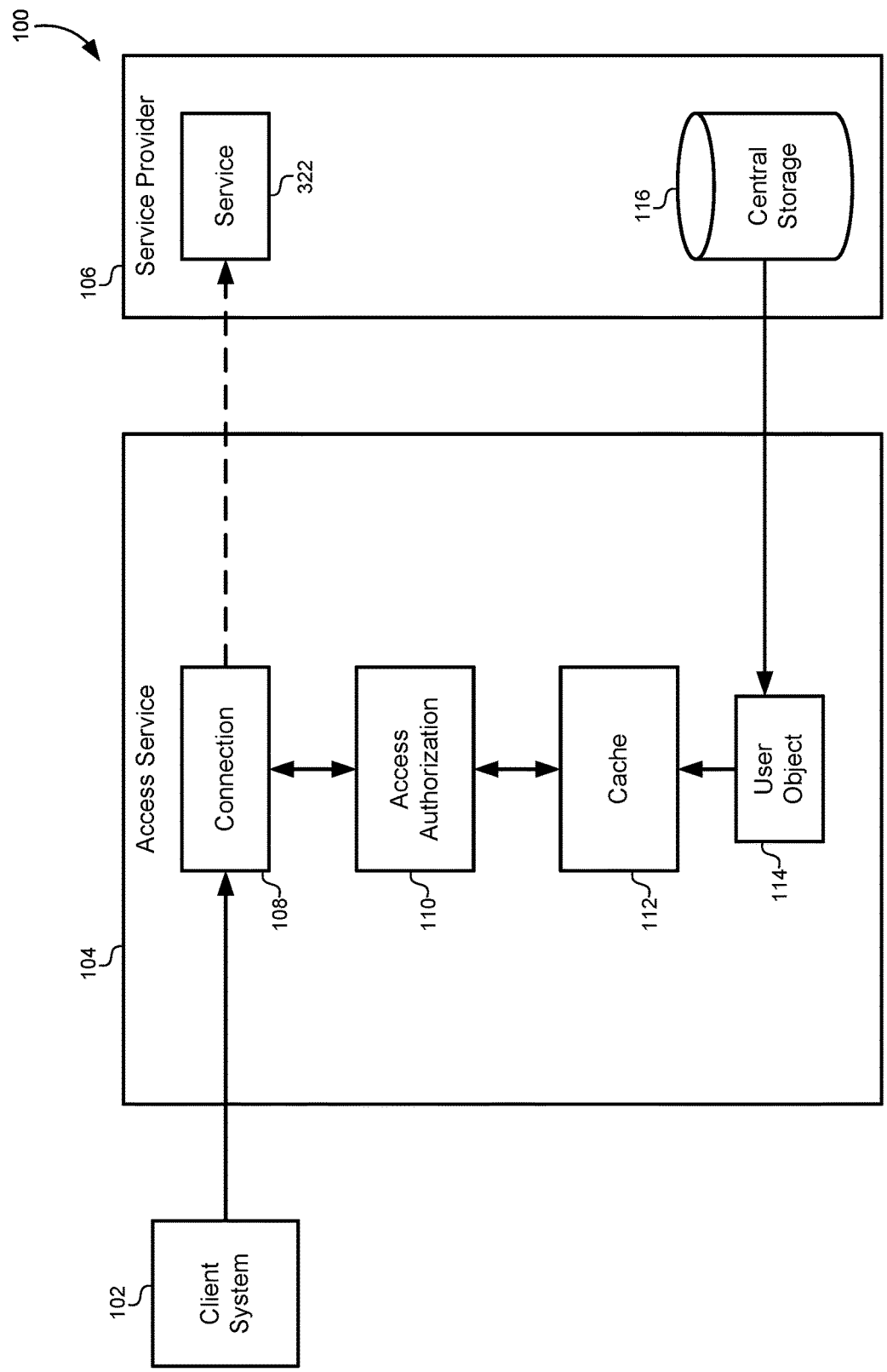
FIG. 1 illustrates an architecture for processing real-time requests to network services, according to some embodiments.

FIG. 1 illustrates an architecture 100 for processing real-time requests to network services, according to some embodiments. In this example, a client system 102 may submit a request through a network for a service 322 provided by a service provider 106. The client device may include any computing device, such as a telephone, a smart phone, a Personal Digital Assistant (PDA), a laptop computer, a notebook computer, a tablet computer, a desktop computer, a Digital Home Assistant (e.g., Amazon Alexa®, Google Home®, etc.), a networked appliance in a smart-home environment, a smart watch, virtual/augmented reality headsets, gateways or routers, server computers, and/or any other type of computing device. The service provider 106 may include any type of online service, such as online movie providers, cellular service providers, streaming music providers, news providers, chat providers, SMS or text providers, distributors or servers associated with applications ("apps") running on computing devices, and/or any other service that may be provided through a network.

In order to secure a connection or gain access to the service 322, the client system may pass a request to access the service 322 through an access service 104. The term access service 104 is used generically to describe an intermediary system between the client system 102 and the service provider 106. The access service 104 may act as a gatekeeper between the client system 102 and the service 322, and may allow or deny a connection or access to the service 322. In one embodiment, the access service 104 may be implemented by an Online Charging System (OCS), which is a system allowing a communications service provider to monitor and charge customers in real-time based on service usage. The OCS may handle user account balances, ratings, charging, control, correlation, and so forth. In some cases, the OCS may allow a telecom operator to ensure that balance limits are enforced and resources are authorized on a per-transaction basis. In this example, the client system 102 may comprise a smart phone operating through a cellular service network. The service provider 106 may include a movie streaming service. The access service 104 implemented by an OCS may be operated by the cellular service network, and may be tasked with monitoring, authorizing, and tracking balances for connections to the movie streaming service. Note that this example using an OCS is provided only by way of example and is not meant to be limiting. In this disclosure, the term access service 104 may apply to any service that is independent of the client system 102 and that processes requests in real-time to gain access to a service provider 106.

Users typically expect requests sent from the client system 102 to be processed in real-time. In this disclosure, the term "real-time" may be used to describe responses that are received by the user through the client system 102 without a delay of more than a few seconds (e.g., 5 seconds) as applied to online requests and responses. When a request is received by the access service 104, the access authorization process 110 may request the full user object 114 from the cache 112. The full user object 114 may then be used to establish or deny a connection 108 with the service 322. In order to process these requests in real-time, the access service 104 may benefit from having access to a full user object 114 that describes many aspects of a user account. In the example of FIG. 1, the full user object 114 may be stored in a central storage 116. The central storage 116 may be implemented as a database, a data store, an online repository, and/or any other form of persistent storage. The central storage 116 may be relatively large, and may be required to store user objects for tens of millions of user accounts. In some cases, the central storage 116 may be located at and/or operated by the service provider 106. For example, the central storage 116 may store user objects representing user accounts for subscribers of the service provider 106. Each user object may be between 100 kB and 20 MB in size in some nonlimiting examples. Therefore, significant storage may often be required to implement the central storage 116. Furthermore, although the central storage 116 may be part of the service provider 106 in FIG. 1, this example is not meant to be limiting. Other embodiments may allow the access service 104 to operate the central storage 116. In other embodiments, the central storage 116 may be operated by another third-party provider that manages accounts or user objects for the service provider 106.

A full user object 114 may include a large amount of information. For example, the full user object 114 may include any information related to the service provider 106, the service 322, and/or how the client system 102 may access the service 322. The full user object 114 may include information for individual services provided by the service provider 106. Therefore, in addition to information for the service 322 illustrated in FIG. 1, the full user object 114 may include information for a plurality of additional services provided by the service provider 106. In cases where the central storage 116 is not operated by the service provider 106, the full user object 114 may also include information associated with additional services provided by other service provider 106. For each individual service, the full user object 114 may comprise specific service types, subscription levels, account information, offers purchased, group memberships, connections between different groups and/or users, rates over time, voicemails, texts, accessible media content, balances for usage, balance logic that determines how balances are adjusted/determined, and/or any other information that may be associated with use of the service 322. The full user object 114 may be implemented as a live Java object, and in one example the full user object 114 may have a size of approximately 300 kB.

In order to determine whether a connection or access to the service 322 should be granted or denied, the access service 104 may use the information in the full user object 114 to determine whether a specific request should be granted. For example, a request to stream content from the service 322 may trigger the access service 104 to examine accessible content, service levels, subscriptions, a balance of remaining time, DRM restrictions, parental controls, geographic restrictions, language availability, and/or additional information that may be used to specifically determine whether a request for a particular piece of content from the service 322 should be granted. Therefore, the full user object 114 typically does not include a single field that can be consulted to determine whether access should be granted. Instead, the full user object 114 may include a plurality of fields that are processed by computing logic to determine whether a specific request should be granted. The full user object 114 may have all of the information necessary for the access service 104 to determine whether any request should be granted or denied.

However, although the full user object 114 may include all of the necessary information, the size of the full user object 114 along with the number of full user objects that may need to be stored by the central storage 116 provides technical challenges for using the full user object 114 to grant or deny requests in real time. Specifically, the nature of the large central storage 116 (e.g., a database) and the size of the full user object 114 may generate a long latency in requesting, receiving, and processing the relatively large full user object 114 for real-time decision-making. The delay in retrieving and processing the full user object 114 may be greater than is acceptable for users expecting a near-instant connection to the service 322. Additionally, because millions of full user objects are stored by the central storage 116, the central storage 116 typically will not be implemented in memory, and may instead require slower, more persistent storage mechanisms.

Instead of using the central storage 116 and the full collection of user objects stored by the central storage 116, the access service 104 may implement a cache 112 that stores a subset of the set of full user objects from the central storage 116. The cache 112 may be implemented using a memory structure that is faster and smaller than the central storage 116. For example, the cache 112 may be stored in memory and may allow rapid access to full user objects stored in the cache 112. This allows the full user object 114 to be available through the cache 112 without the significant delay that would otherwise be associated with retrieving the full user object 114 from the central storage 116.

Figure 2:
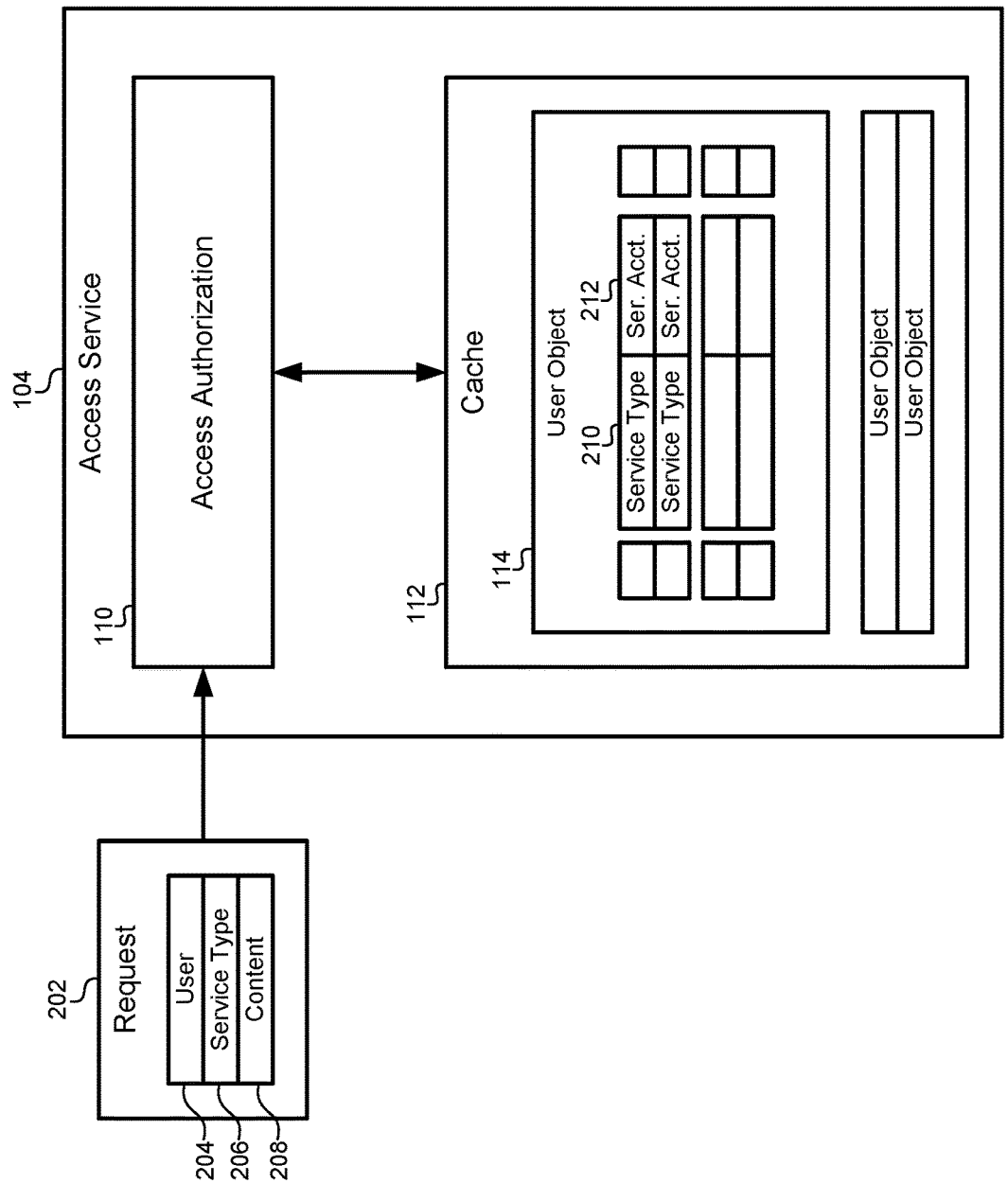
FIG. 2 illustrates an example of how the access service can process the request using a full user object from the cache, according to some embodiments.

FIG. 2 illustrates an example of how the access service 104 can process the request 202 using a full user object 114 from the cache 112, according to some embodiments. When a request is received by the access service 104, the access authorization process 110 may request the full user object 114 from the cache 112. The full user object 114 may then be used to establish or deny a connection 108 with the service 322. For example, the request itself may identify a user, a user identifier 204, a service type 206, information related to specific content 208 requested from the service, and/or information related to the client system 102. Using this information, the access authorization process 110 may identify a specific user account and request the full user object 114 associated with that user account from the cache 112. If the full user object 114 is already available in the cache 112, this may be considered a "cache hit," and the full user object 114 may be provided to the access authorization process 110. If the full user object 114 is not already in the cache 112, the cache may request the full user object 114 from the central storage 116 in what is referred to as a "cache miss." In order to efficiently store full user objects such that they are available for real-time retrieval, the cache 112 may typically store fewer full user objects than are available at the central storage 116. Thus, only a subset of the full user objects may be stored in the cache 112 at any time. As new requests are made for different full user objects, the cache 112 may evict existing user objects and replace them with new user objects from the central storage 116.

The cache 112 may include the full user object 114, which in turn may include any and/or all information related to one or more services associated with the user account. The information in the full user object 114 may be used in conjunction with the information in the request 202 by the access authorization process 110 to determine whether the access should be granted to the specific service. For example, the user identifier 204 may be used to locate the specific full user object 114. The service type 206 may be used to select one of the available services 210 that are described in the full user object 114 (e.g., services with which the user may have a subscription or account). The request 202 may include a request for a specific type of content 208, which may be compared to a plurality of fields 212 related to that specific service to determine whether access should be granted. For example, if the request for content 208 comprises a request for a particular movie to be streamed to the client device, the full user object 114 may retrieve user account details for a streaming movie service and determine whether all of the account specifics in the plurality of fields 212 allow that particular movie specified by the content 208 to be streamed to the client device. In another example, the client device may submit a request 202 to make a cellular or text connection to another user device. The user object 114 may access text messaging plans, available minutes, in-network connections, out-of-network connections, and other information from the plurality of fields 212 for the cellular service to determine whether the text message or cellular connection should be made according to the request 202. Note that these examples are not meant to be limiting, and any type of request for a service may be used.

In many cases, the access authorization process 110 may look at a balance stored in the full user object 114 to determine whether to grant access according to the request 202. The full user object 114 may store a remaining balance of time, value, items, or other quantities that may be used to service requests. For example, one of the plurality of fields 212 related to a streaming movie service may include a number of movies remaining in a particular month that may be streamed by the user. In another example, one of the plurality of fields 212 may include a balance of minutes that may be used for cellular telephone connections. Another example may store a balance of data that may be downloaded in a particular month, and so forth. These balances may be processed with the request 202 to determine whether the request 202 may be granted. For example, if a balance of 30 minutes streaming remains in the full user object 114, and the request 202 includes a movie that is two hours long as the requested content 208, the request may be denied based on the remaining balance and the expected usage required for the request 202. In another example, a cellular connection may be requested and an available balance of 100 minutes may remain in full user object 114, which may allow the request 202 to be granted.

Although using the cache 112 does provide a solution for evaluating requests in real time, it also presents another set of technical challenges. For example, repeated requests from single users may be separated by thousands or millions of requests from other users. Therefore, maintaining a full user object in the cache 112 between request from the same user becomes increasingly unlikely as the number of user accounts grows. After an initial request is made and the full user object 114 is loaded into the cache 112, it is likely that thousands or even millions of other requests will be received from other users before another request is made from the same user. It will be very likely that the cache 112 will have already evicted the full user object 114 in favor of full user objects from more recent requests by the time a second request is received from the same user account associated with the full user object 114. Thus, a large number of the requests may result in a cache miss at the cache 112 and require the longer delay of accessing the central storage 116 on each cache miss.

In order to solve these and other technical problems, some embodiments may implement the cache structure of the access service 104 using a special surrogate cache that acts as an intermediary between the cache 112 and the access authorization process 110. The surrogate cache may include "compact" user objects that are significantly smaller than the full user objects stored in the cache 112. In some cases, a compact user object in the surrogate cache may include as little as a single field for each service indicating whether a subsequent request should be granted or not. This allows the surrogate cache to have all of the advantages of both the cache 112 and the central storage 116. Specifically, the surrogate cache may include compact versions of most if not all of the full user objects in the central storage 116, while maintaining the small, fast, in-memory advantages of the cache 112.

Figure 3:
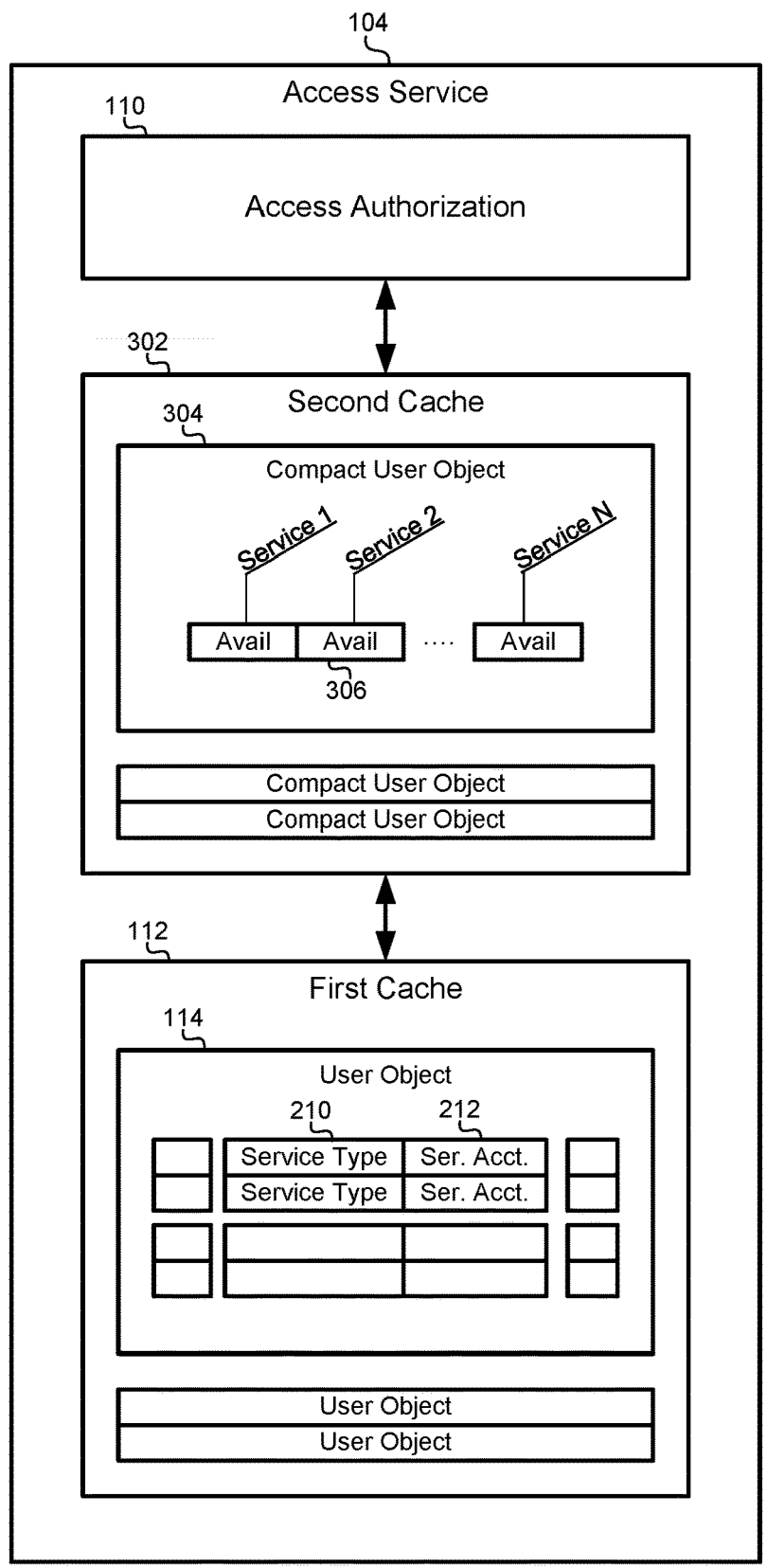
FIG. 3 illustrates an example of a multi-level cache that may be used between the access authorization process and the central storage, according to some embodiments.

FIG. 3 illustrates an example of a multi-level cache that may be used between the access authorization process 110 and the central storage 116, according to some embodiments. For clarity, the cache 112 described above in FIGS. 1-2 may be referred to as a "first" cache 112, and the surrogate cache described above may be referred to as a "second" cache 302 throughout the remainder of this disclosure. Similarly, the full user object 114 stored in the first cache 112 may be referred to as a first user object 114, and the compact user object stored in the second cache 302 may be referred to as a second user object 304. The terms first last second are used merely to distinguish one cache from the other, and do not necessarily imply ordering, importance, size, or any other characteristic of a cache.

The second cache 302 may be structured similarly to the first cache 112. The second cache 302 may be implemented in memory and may include compact user objects that represent scaled-down or summary versions of the full user objects in the first cache 112. In some cases, the compact user object 304 may be multiple orders of magnitude smaller than the corresponding full user object 114 in the first cache 112. For example, a full user object 114 may be approximately 1 MB, while a compact user object may be as small as approximately 10-20 bytes. Because of this drastic size reduction when moving from the full user object 114 to the compact user object 304, the second cache 302 may include compact versions of many more user objects than can possibly be included at one time as full user objects in the first cache 112. This allows the second cache 302 to cover most if not all of the users in the central storage 116 while still maintaining a speed and efficiency that may even be greater than that of the first cache 112.

The relationship between the second cache 302 acting as a surrogate and the first cache 112 may be contrasted with traditional multi-level caches, such as an L1, L2, L3 cache structure. In traditional multi-level caches, higher cache levels typically operate using faster hardware/software than lower-level cache levels. Cache transparency usually exists where a lower level of a cache includes all of the data in a higher level of the cache. Furthermore, objects in a higher level of traditional caches are identical to objects in lower levels of these caches, such that multiple identical copies of an object existing different levels of the cache. In contrast, these embodiments use a second cache 302 that includes more user objects than the lower level first cache 112, which is the opposite of traditional caches. Additionally, the compact user objects stored in the second cache 302 are fundamentally different from the full user objects stored in the first cache 112. Instead of including just a subset of the plurality of fields 212 in the full user object 114, the compact user object 304 may include a new data field that summarizes or is derived from information stored in the full user object 114. Thus, the second cache 302 generates a new type of information with new data to store in the compact user object 304. This is possible and beneficial because the second cache 302 may be specifically tailored to providing information for the access authorization process 110 to simply approve or deny a request for a connection. The second cache 302 may be designed specifically for this purpose.

The compact user object 304 in the second cache 302 may include at least one field for each service that is accessible by the user account. Each field may be populated with a value that indicates whether a subsequent request for that particular service should be granted. Different values may be stored in different fields, as users may be allowed to access services differently and at different times. For example, a first field for a first service may include a GREEN value that indicates a subsequent request for the first service should be granted immediately. A second field for a second service may include a RED value indicating that a subsequent request for the second service should be denied.

When a request is received for a specific service, the access authorization process 110 may query the second cache 302 and retrieve the corresponding field for the service from the compact user object 304. This process may involve simply looking up the value of a field for that service and comparing it to a threshold to allow authorization. For example, the access authorization process 110 may receive a GREEN value from the compact user object 304 and immediately grant the service. This may be done without consulting other fields in the full user object 114 or performing any processing on the plurality of fields 212 in the full user object 114. Thus, use of the second cache 302 may decrease the overall latency of authorizing a request, even when the full user object 114 persists in the first cache 112.

Additionally, this dramatically decreases the likelihood of a cache miss in the second cache 302. Because the compact user objects are so much smaller than the full user objects, the second cache 302 can often store all of the compact user objects for users providing requests, whereas the first cache may only provide a very limited subset of the full user objects that may otherwise be available.

In some embodiments, the surrogate cache 302 may act as a front end for a backend server or process. The access service 104 may receive requests as a front end and establish connections to a backend process or service. Operating centrally, the access service 104 may track balances and usage of services across different service providers. For example, a cellular network may allow a certain amount of data to be downloaded through the network. Users may connect to many different service providers, and downloads from those service providers may all reflect a single download quota assigned to the user account through the network.

Figure 4:
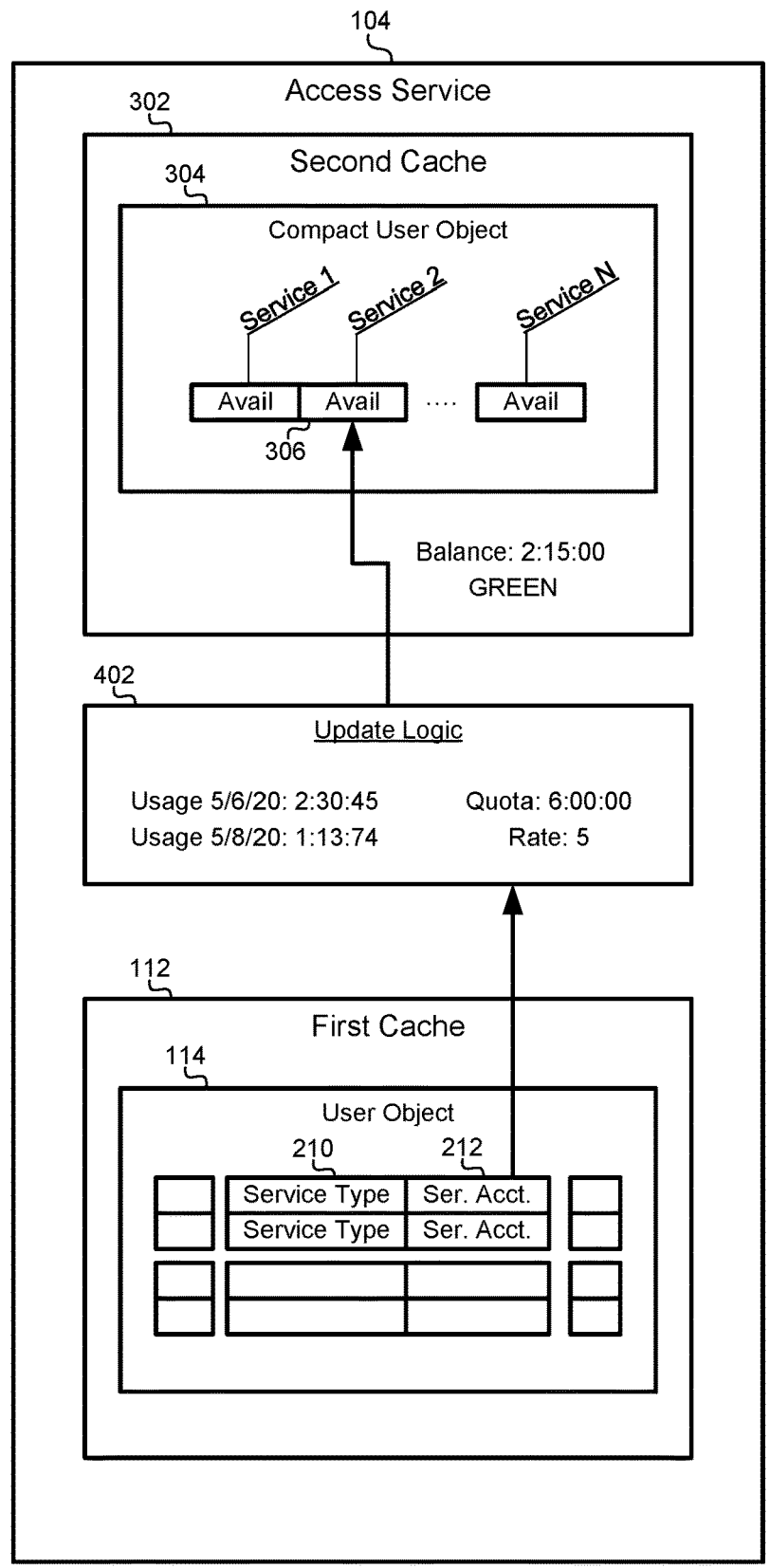
FIG. 4 illustrates how the value for the field in the compact user object may be derived from a plurality of fields in the full user object, according to some embodiments.

FIG. 4 illustrates how the value for the field 306 in the compact user object may be derived from a plurality of fields 212 in the full user object 114, according to some embodiments. The access service 104 may use update logic 402 to update the value of the field 306 in the compact user object 304 using some of the plurality of fields 212 in the full user object 114. In some cases, a single field may be used from the plurality of fields 212 to generate the value for the field 306. For example, a balance in the plurality of fields 212 may be used to set the value for the field 306 in comparison to a threshold. In other cases, more than one field may be used, such as a balance, a service level, a description type, and so forth.

The update logic 402 may be specific to each type of service. In some embodiments, the full user object 114 itself may include the update logic 402. This allows the full user object 114 to be a self-contained concept that provides its own update logic 402. In other embodiments, the update logic 402 may be provided by the access service 104. The update logic may include mathematical and/or logical operations that combine one or more of the plurality of fields 212 to generate a value for the field 306 in the compact user object 304. Although the details of each set of update logic 402 will differ for each specific service type, some examples are provided here by way of illustration. In a first example, the update logic 402 may retrieve a balance of remaining minutes, value, and/or items from the full user object 114 and apply various thresholds to assign a value to the field 306. This derives the value for the field 306 by determining a percentage of an allowed amount of access or balance remaining in the corresponding user object. Some implementations may use a 40-60 rule. When available quota is more than 40%, the value may be set to GREEN. Once an available quota is more than 40% but less than 60%, the value may be set to YELLOW. When the available quota is less than 60%, the value may be set to RED. In a second example, the update logic 402 may analyze content restrictions, parental permissions, and other settings in the full user object 114 to determine content that may be streamed over the network. If the permissions/restrictions are very high, the value may be set to RED, whereas if the permissions/restrictions are very low, the value may be set to GREEN. In a third example, the update logic 402 may analyze a number of remaining text messages available under a text messaging plan and set the value based on a percentage of the remaining amount. In a fourth example, the update logic 402 may analyze security settings and/or security events related to the full user object 114. If the security threat is low, the value may be set to GREEN, with increasing levels of the security threat increasing the value from YELLOW to RED progressively. Note the specific implementations are provided only by way of example and are not meant to be limiting. Any type of update logic 402 may be programmed to take the plurality of fields 212 from the full user object 114 and derive a value indicating whether a subsequent request should be granted.

In the example above, the value for the field 306 in the compact user object 304 related to the service progresses through an enumerated list of values, such as GREEN, YELLOW, and RED. However, aside from this example, any other type of value may be used. For example, some embodiments may use a single Boolean value for each field providing a simple yes/no evaluation for each service. This may allow the compact user object 304 to be very small, using only a single bit for each service. Some embodiments may use a numerical value in the field 306, such as a remaining balance of time, value, discrete objects, storage space, and/or the like. Some embodiments may include a white list and/or black list of requests that should be granted/denied. For example, the field may be set to GREEN with a black list of content items that should not be streamed. Alternatively a field may be set to RED with a white list of content items that should be allowed.

In the example above, a field value of GREEN allowed a request to be granted, while a field value of RED allowed a request to be denied. Besides these yes/no values, some embodiments may allow one or more intermediate values (e.g., YELLOW). When an intermediate value is stored in the field 306 of the compact user object 304, the request may be granted with limitations. For example, the field value may be set to YELLOW when between 40% and 60% of an available quota remains. When a request is received, the request may be granted, but limitations may be placed on the amount of content, etc., that are provided by the service 322. For example, a download limit of 40 MB may be imposed. A maximum length may be imposed on a phone call. A service may only allow a single movie to be downloaded, and so forth.

Figure 5:
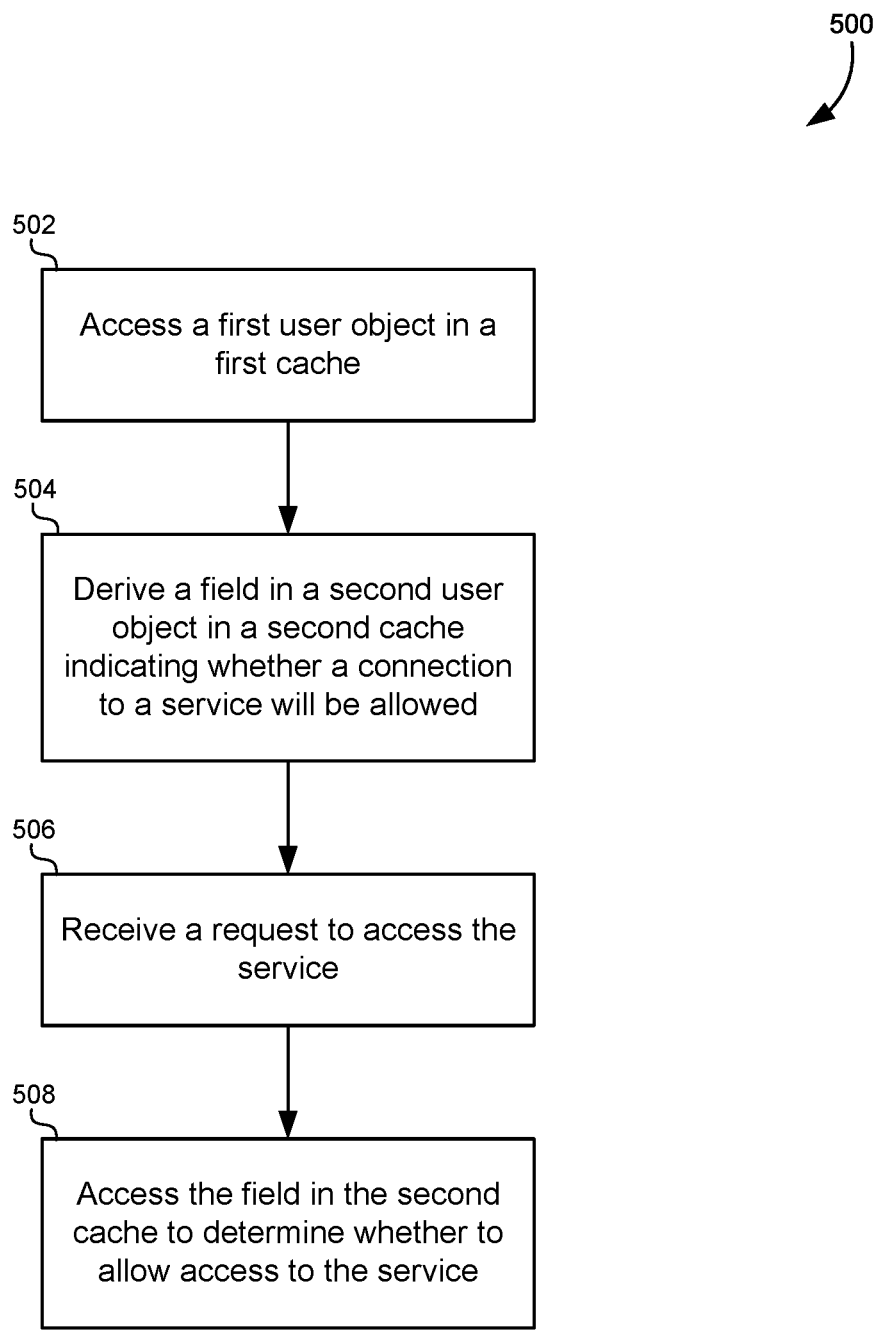
FIG. 5 illustrates a flowchart of a method for optimizing a user object cache, according to some embodiments.

FIG. 5 illustrates a flowchart 500 of a method for optimizing a user object cache, according to some embodiments. The method may include accessing a first cache comprising a first user object associated with a user account (502). The first cache may be the cache 112 illustrated above in FIGS. 1-4 that stores full user objects. The first user object may be the full user object 114 discussed above. The first user object may include a plurality of fields associated with a service. The first user object may also include additional pluralities of fields associated with other services. Overall, the first user object may be relatively large, such as more than 100 kB or more than 1 MB. The first cache may be communicatively coupled to a data store that stores a full listing of full user objects for the various services handled by the access service such as the central storage 116 described above. The central storage 116 may be located at the service provider, at the access service, at a third-party provider, and so forth. The first cache may receive the first user object from the data store as a result of a cache miss, and may maintain a subset of full user objects compared to the full set of user objects found in the data store.

The method may also include deriving a field in a second user object associated with the user account in a second cache (504). Update logic may be used to derive the value for the field in the second user object from the plurality of fields in the first user object as described above in FIG. 4. The second user object may be a compact user object that may include as few as one field for each service. The second cache may also include compact user objects for every full user object in the first cache. The second cache may also include a compact user object for every full user object in the data store or central storage. The second cache may be configured specifically to make rapid determinations as to whether access or a connection should be granted for a requested service without requiring extensive processing, calculations, or loading of the plurality of fields in the first user object.

The method may further include receiving a request from a client device to access the service with the user account (506). As illustrated in FIG. 2 above, the request may identify a user account, a specific service, and a request/content related to that service. The request may be received from any type of client device, and the service may include any type of service available over a network connection, including telecom services, media services, communication services, data storage services, and so forth.

The method may additionally include accessing the field in the second user object in the second cache to determine whether to allow the client device to access the service (508). As described above in FIGS. 3-4, the value of the field may be used to provide a rapid determination as to whether the request should be granted, resulting in a real-time response from the access service. For example, some embodiments a evaluate the field and grant/deny access in less than three seconds.

It should be appreciated that the specific steps illustrated in FIG. 5 provide particular methods of optimizing a cache in and access service, according to various embodiments. Other sequences of steps may also be performed according to alternative embodiments. For example, alternative embodiments may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 6:
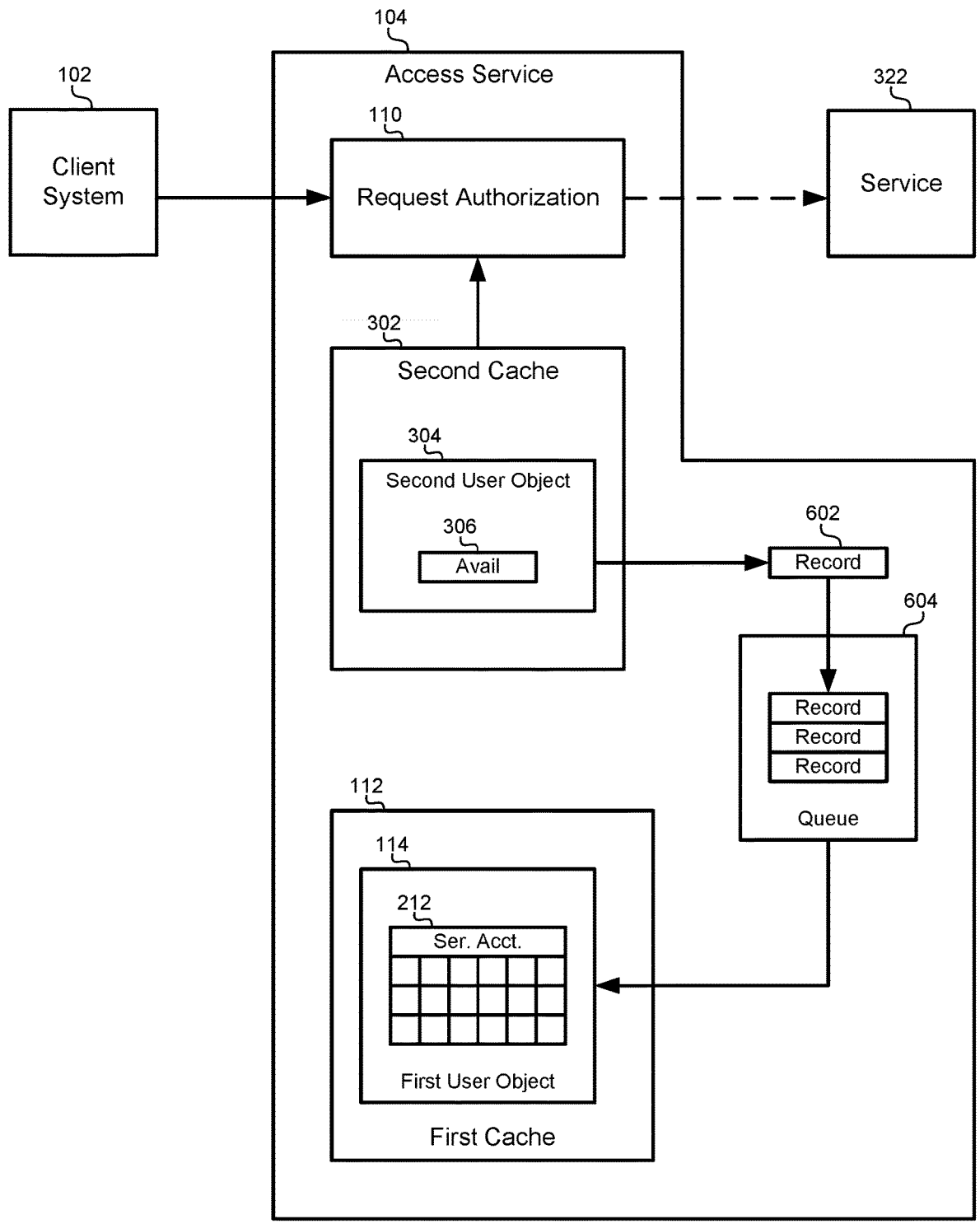
FIG. 6 illustrates how the full user object may be updated after a request is granted using the second cache, according to some embodiments.

FIG. 6 illustrates how the full user 114 object may be updated after a request is granted using the second cache 302, according to some embodiments. After a request is granted, some of the plurality of fields 212 in the full user object 114 may need to be updated. For example, if a request to send a text message is granted, a balance of remaining text messages may need to be adjusted. In another example, if a movie is downloaded from the service 322, a value owed may need to be updated. One of the technical advantages provided by the second cache 302 is the ability to separate the ability to grant/deny a request in real time from the rest of the overhead involved with maintaining a full user object. Therefore, processing the result of a granted access or connection may be handled off-line at a time after the request is granted.

When a request is approved, a record 602 may be generated of the request. This record may be placed in an offline record storage queue 604. The record storage queue 604 may include records from a plurality of different requests from a plurality of different user accounts. Each time a request is granted or denied, a record 602 may be generated and added to the record storage queue 604. The record 602 may include an amount of a resource provided or used by virtue of a connection to the service 322. For example, the record 602 may include a number of content objects that were streamed from the service 322, a number of minutes that were used for the service 322, an amount spent at the service 322, a number of messages sent through the service 322, and so forth. The records in the record storage queue 604 need not be processed as they are received. Instead, they may be saved for a later, off-line processing operation.

As described above, the second cache 302 allows the system to separate the approval of a request from the actual processing involved with that request. The operation to update the full user object 114 may be saved until the system has sufficient processing power, bandwidth, memory availability, and/or other computing resources available to perform the operation. Each of the records in the record storage queue 604 may be processed sequentially to update corresponding values in the plurality of fields 212 of the full user object 114. For example, the record may include a user identifier that may be used to retrieve a full user object 114 corresponding to that record 602. The information described above that may be stored in the record 602 may be used to update the plurality of fields 212 in the full user object 114. For example, a remaining amount of an available resource or balance may be adjusted or calculated to reflect usage that resulted from approving the request. Each of the records in the record storage queue 604 may be processed and corresponding full user objects may be updated. This allows the record storage queue 604 to be processed as a batch operation when sufficient processing power is available to do so.

After the full user object 114 has been updated, the process described above in FIGS. 3-4 may be carried out to update the value stored in the field 306 of the compact user object 304. For example, the update logic 406 may be executed on the new values in the plurality of fields 212 in the full user object 114 to generate a new value for the field 306 in the corresponding compact user object 304. This operation may be carried out for each full user object that has changed. Furthermore, the update operation for each of the records in the record storage queue 604 need not be executed on the first cache 112. Instead, this operation may be carried out to target the central storage 116. The central storage may be updated and then may push new versions (or change events) of the full user object back to the first cache 112. Alternatively, objects in the first cache 112 may be updated and new versions of the full user objects may be pushed back to the central storage 116 for an update.

Figure 7:
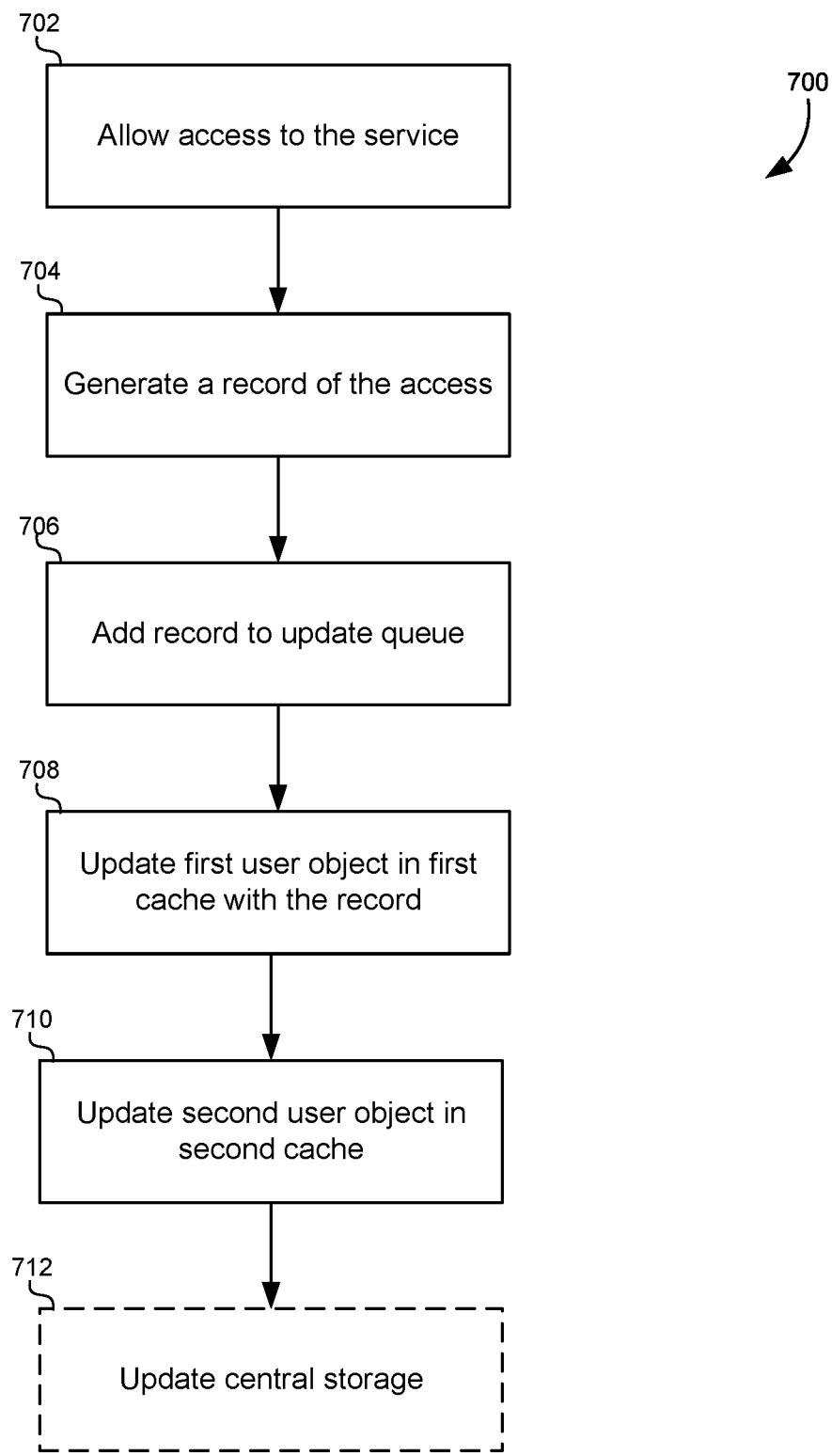
FIG. 7 illustrates a flowchart of a method for updating a surrogate cache, according to some embodiments.

FIG. 7 illustrates a flowchart 700 of a method for updating a surrogate cache, according to some embodiments. The method may include allowing access to the service (702). This method may begin execution where the method of FIG. 5 ends, such that access has been granted or a connection has been established according to a request for a service from the client device. The method may also include generating a record of the access (704). The record may include an amount of a resource used by virtue of accessing the service as described above in FIG. 6. The record may be added to a record update queue (706). The record update queue may store records from granted requests until they are ready to be processed. The update process may be triggered when sufficient computing resources are available, after a time limit expires, after a threshold number of records have been received in the queue, when requests are granted having a YELLOW status, when requests are granted that are likely to come within a threshold of exceeding a quota amount, and so forth.

The method may also include updating a first user object in the first cache using the record (708). The first user object may include the full user object described above. A remaining balance of minutes, data, items, value, etc. may be updated such that the plurality of fields in the full user object reflect the results of granting access according to the request above. After the full user object has been updated, the method may include updating a second user object in the second cache (710). The second user object may represent the compact user object corresponding to the full user object. The compact user object may include a field that stores a value derived from the fields in the full user object using the update logic as described above. In some cases, the method may also include updating a central storage with the new version of the full user object. These updates to the full user object in the central storage and/or the first cache may be executed using change events as described below.

It should be appreciated that the specific steps illustrated in FIG. 7 provide particular methods of updating a surrogate cache according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 8:
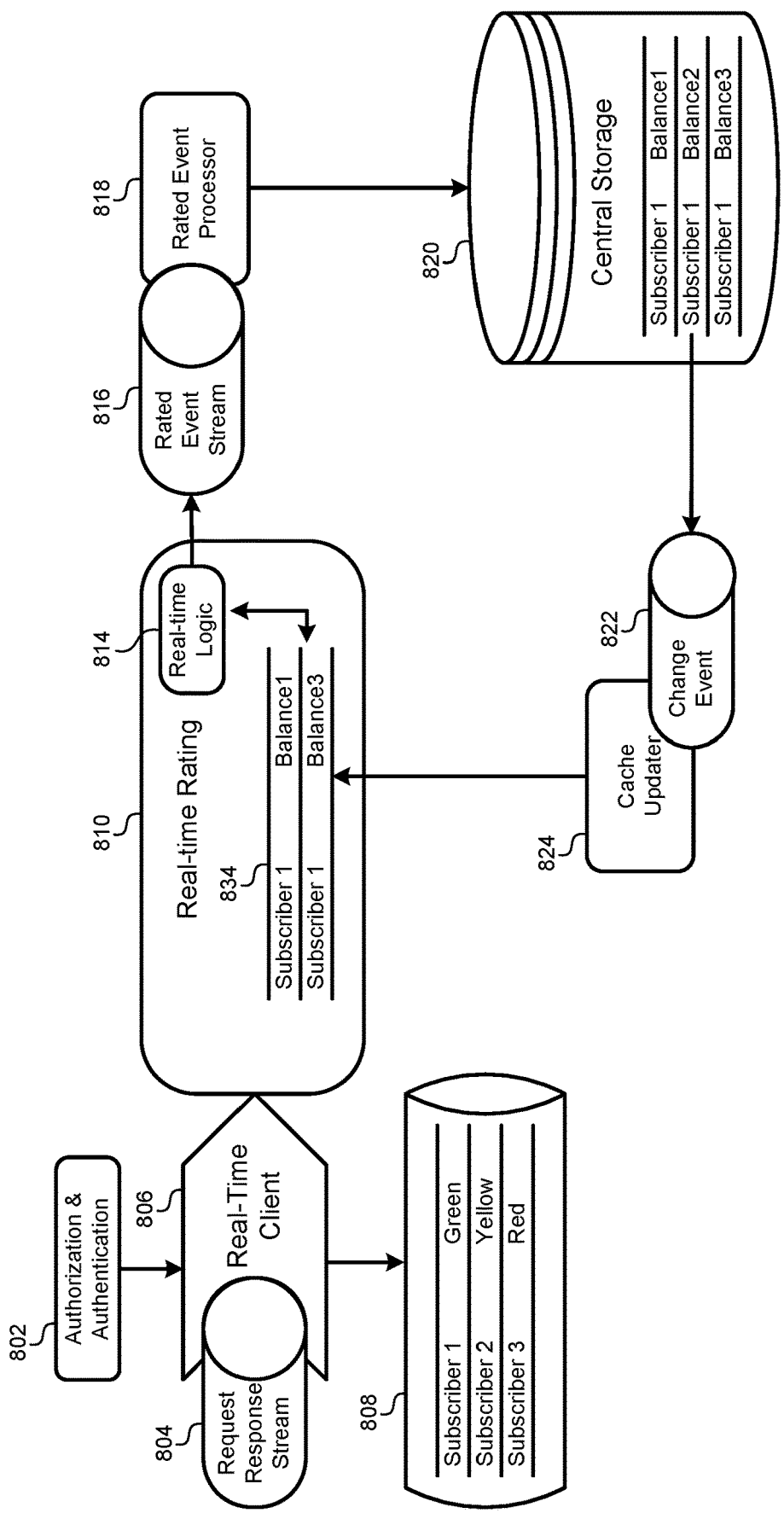
FIG. 8 illustrates a dataflow diagram for processing real-time requests, according to some embodiments.

FIG. 8 illustrates a dataflow diagram for processing real-time requests, according to some embodiments. Requests may be received in a request response stream 804 by a real-time client 106. Each event in the request response stream 804 may be processed sequentially by the real-time client 806. For example, an authorization and authentication process 802 may be executed on each request in the stream 804. A surrogate cache 808 may be accessed as part of processing a real-time request. For example, Subscriber 1 may submit a request to download content from a service provider. The surrogate cache 808 may return a value of GREEN to the real-time client 806 indicating that the request may be approved.

After approval, a real-time rating process 810 may receive a change in the remaining balance of a resource quota allocated to the user account. Real-time logic 814 may execute to update the available balance (e.g., Balance 3), and may generate an event that may be passed to a rated event stream 816. A rated event processor 818 may execute an update on the corresponding full user object at the central storage 820. To complete the update process, a change event 822 may be generated and passed to a cache updater 824, which may update the plurality of fields in the full user object of the first cache. Then, as described above, the values in the second cache may also be updated.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
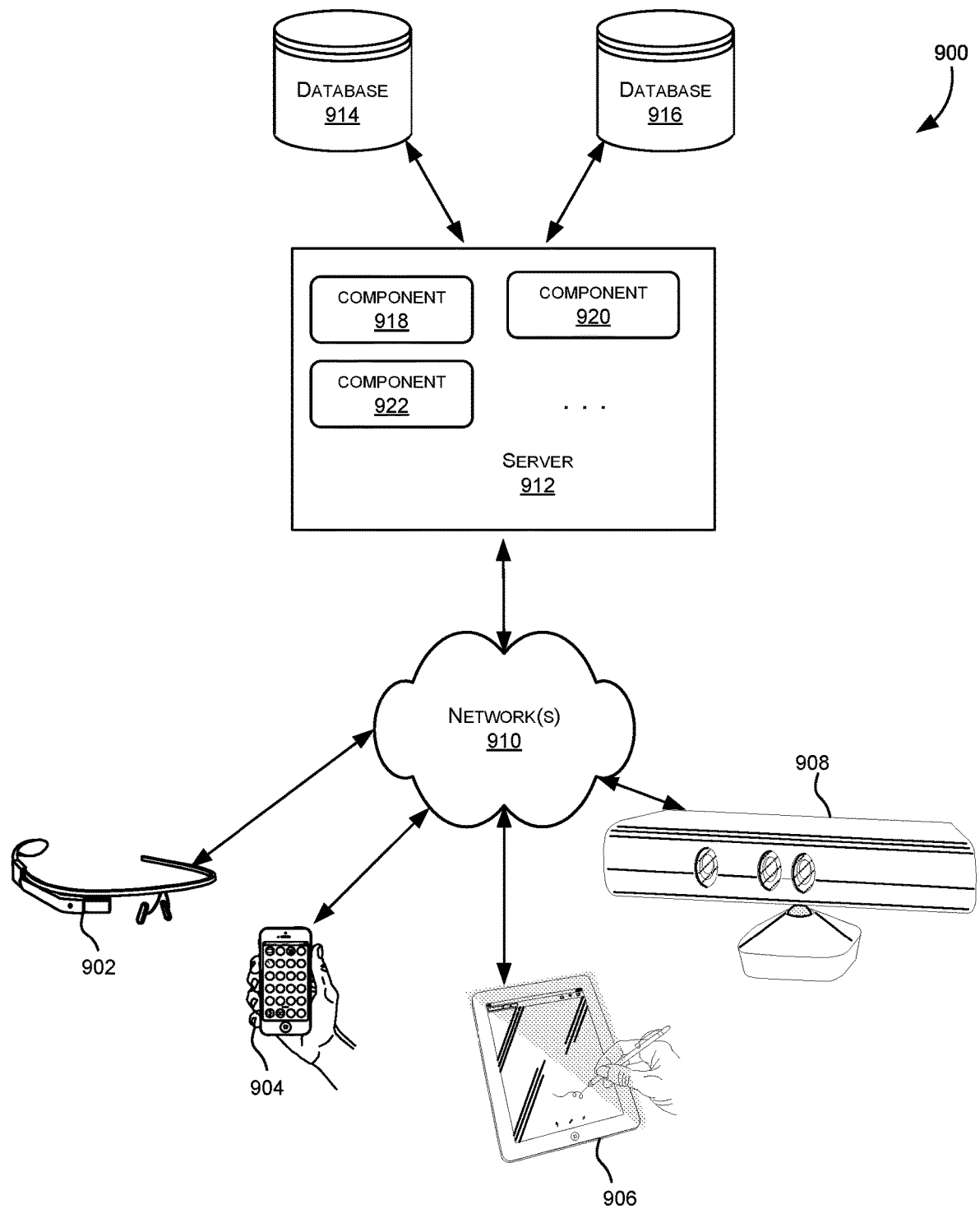
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
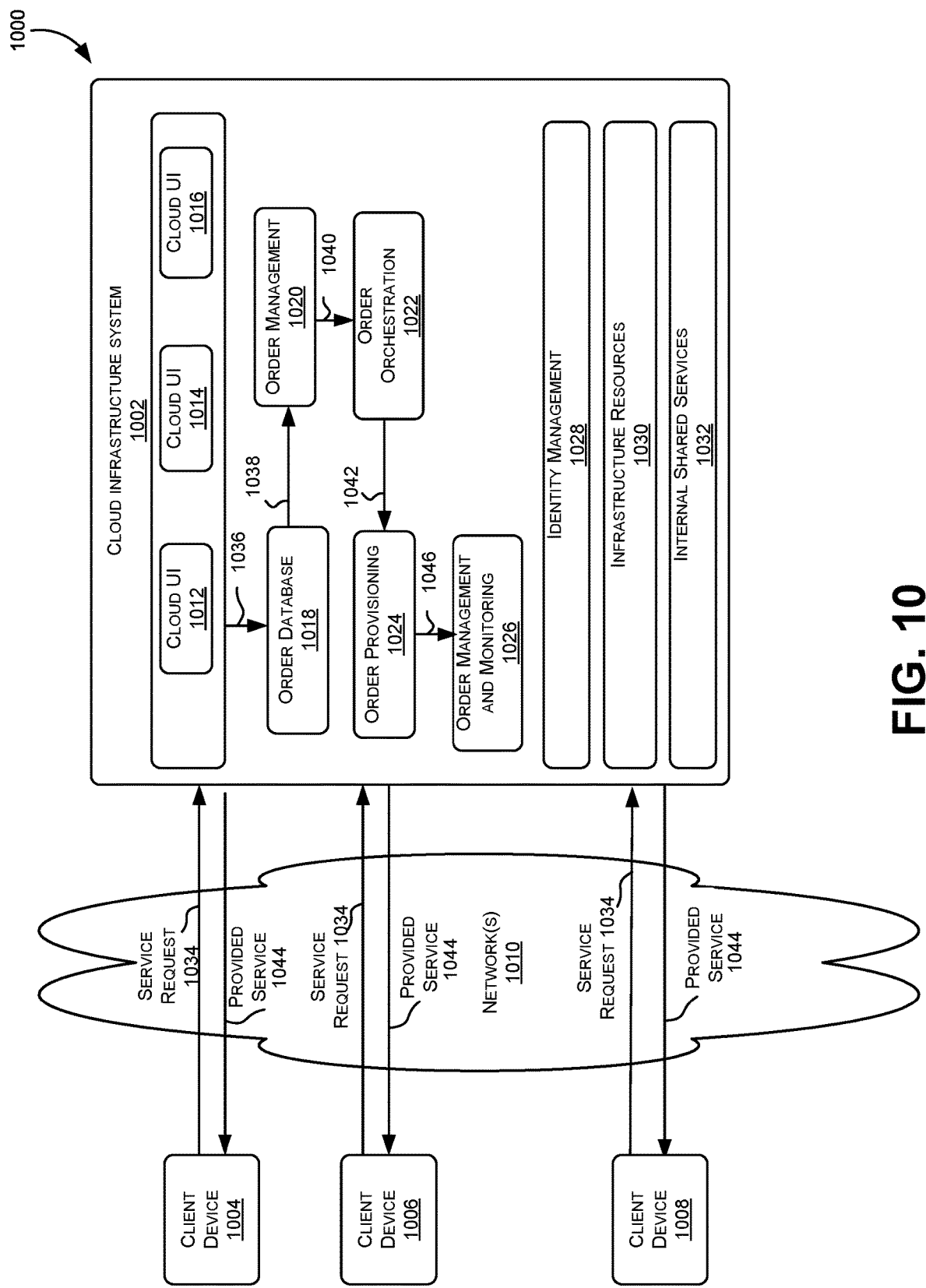
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the FIG. may have other components than those depicted. Further, the system shown in the figure is only one example of a cloud infrastructure system that may incorporate some embodiments. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
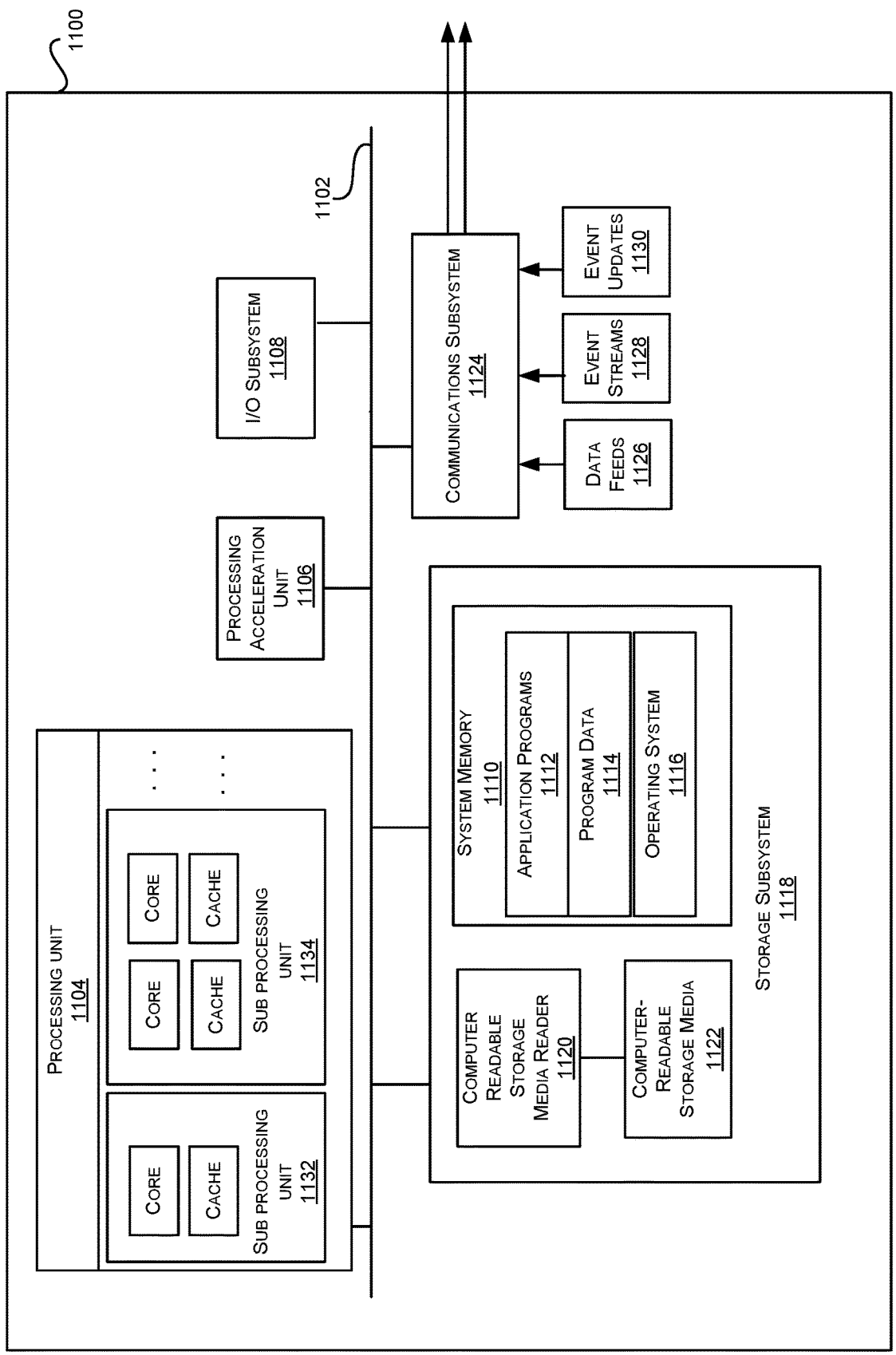
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   accessing a cache comprising a full user object associated with a user account, wherein the full user object comprises a plurality of fields associated with a service;
   generating a compact user object associated with the user account in a surrogate cache, wherein the compact user object is derived from the full user object and uses less memory than the full user object; and
   accessing the compact user object in the surrogate cache instead of accessing the full user object in the cache when determining whether to allow a client device to access the service.

2. The non-transitory computer-readable medium of claim 1, wherein a field in the compact user object is derived from the plurality of fields of the full user object and stores a value comprising:
   a first value indicating that access to the service will be granted;
   a second value indicating that limited access to the service will be granted; or
   a third value indicating that no access to the service will be granted.

3. The non-transitory computer-readable medium of claim 1, wherein the surrogate cache represents a compact version of the cache, and the surrogate cache maintains compact versions of user objects that have been evicted from the cache.

4. The non-transitory computer-readable medium of claim 1, wherein the compact user object is approximately 10 times smaller than the full user object.

5. The non-transitory computer-readable medium of claim 1, wherein the compact user object indicates a specific service in a plurality of services, and the full user object comprises subdivisions for each of the plurality of services.

6. The non-transitory computer-readable medium of claim 1, wherein the compact user object comprises a value indicating that limited access to the service will be granted and limits a time or a bandwidth available during the limited access.

7. The non-transitory computer-readable medium of claim 1, wherein:
   the full user object comprises pluralities of fields for a plurality of services; and
   the compact user object comprises single fields for each of the plurality of services.

8. The non-transitory computer-readable medium of claim 1, wherein generating the compact user object comprises determining a percentage of an allowed amount of access remaining in the user account.

9. The non-transitory computer-readable medium of claim 1, wherein the operations further comprise:
   generating a record of an access to the service that indicates an amount of access used by the client device.

10. The non-transitory computer-readable medium of claim 9, wherein the operations further comprise:
    adding the record of the access to the service to an offline record storage queue.

11. The non-transitory computer-readable medium of claim 10, wherein the operations further comprise:
    processing the record from the offline record storage queue to update fields in the full user object in the cache.

12. The non-transitory computer-readable medium of claim 10, wherein the operations further comprise:
    processing the record from the offline record storage queue to update a database of user objects at the service.

13. The non-transitory computer-readable medium of claim 11, wherein the operations further comprise:

updating the compact user object in the surrogate cache based on updated fields in the full user object in the cache prior to processing subsequent requests to access the service.

14. The non-transitory computer-readable medium of claim 11, wherein a determination is made to allow a client device to access the service in real time as a request from the client device is received, and wherein the record from the offline record storage queue is processed after access is allowed for the client device to access the service.

15. The non-transitory computer-readable medium of claim 11, wherein the operations further comprise:

processing each of a plurality of records in the offline record storage queue, wherein the plurality of records are received from a plurality of different requests to access a plurality of different services, and the plurality of records are processed together as a batch.

16. The non-transitory computer-readable medium of claim 1, wherein the service comprises a telecom service.

17. The non-transitory computer-readable medium of claim 1, wherein generating the compact user object comprises summarizing information stored in the full user object, wherein summarized information in the compact user object is not a subset of information stored in the full user object.

18. The non-transitory computer-readable medium of claim 1, wherein the summarized information comprises an enumerated list of labels summarizing numerical ranges in the full user object.

19. A method of optimizing a user object cache, the method comprising:

accessing a first cache comprising a first user object associated with a user account, wherein the first user object comprises a plurality of fields associated with a service;

accessing a cache comprising a full user object associated with a user account, wherein the full user object comprises a plurality of fields associated with a service;

generating a compact user object associated with the user account in a surrogate cache, wherein the compact user object is derived from the full user object and uses less memory than the full user object; and accessing the compact user object in the surrogate cache instead of accessing the full user object in the cache when determining whether to allow a client device to access the service.

20. A system comprising:

one or more processors; and one or more memory devices comprising instructions that, when executed by the one or more processors, cause the one or more processors to perform operations comprising:

accessing a cache comprising a full user object associated with a user account, wherein the full user object comprises a plurality of fields associated with a service;

generating a compact user object associated with the user account in a surrogate cache, wherein the compact user object is derived from the full user object and uses less memory than the full user object; and accessing the compact user object in the surrogate cache instead of accessing the full user object in the cache when determining whether to allow a client device to access the service.

* * * * *